Feb. 28, 1939.  R. STAGL  2,149,191
SCULPTURAL, ARCHITECTURAL, AND LIKE OBJECTS
Filed Oct. 2, 1935  3 Sheets-Sheet 2
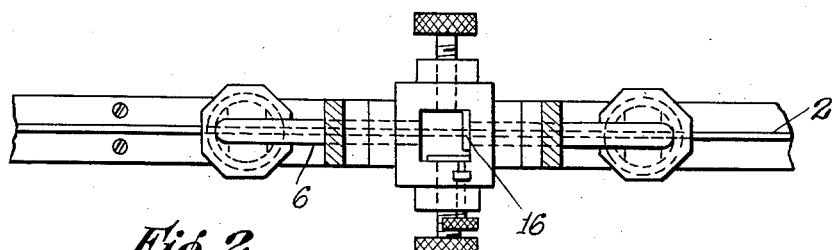
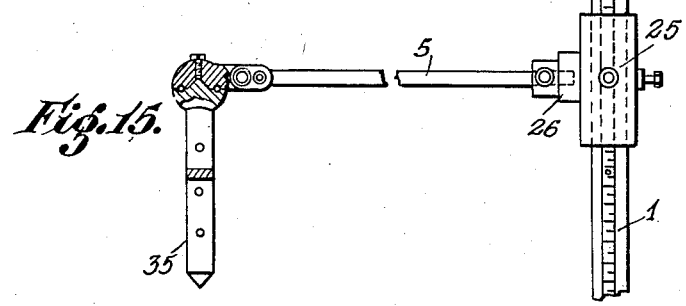
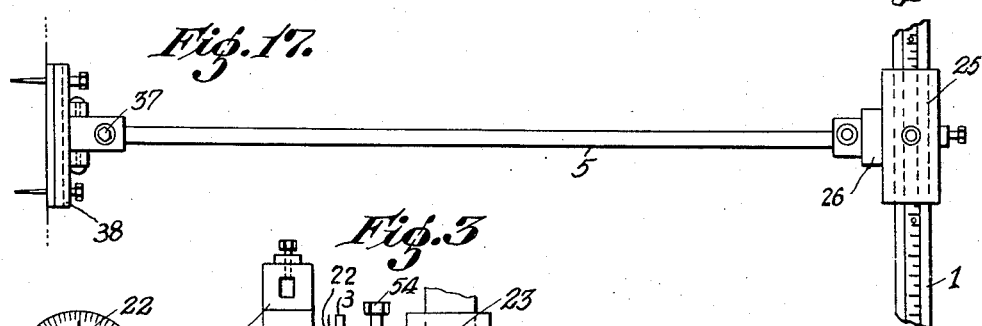
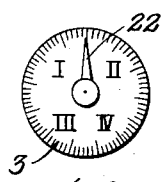
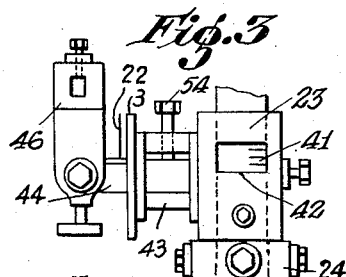
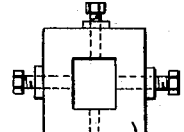
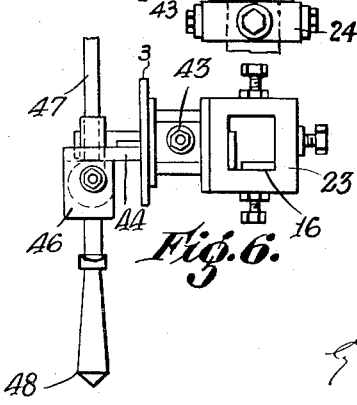
Inventor:
Rodolphe Stagl,
Frank S. Appleman
attorney.

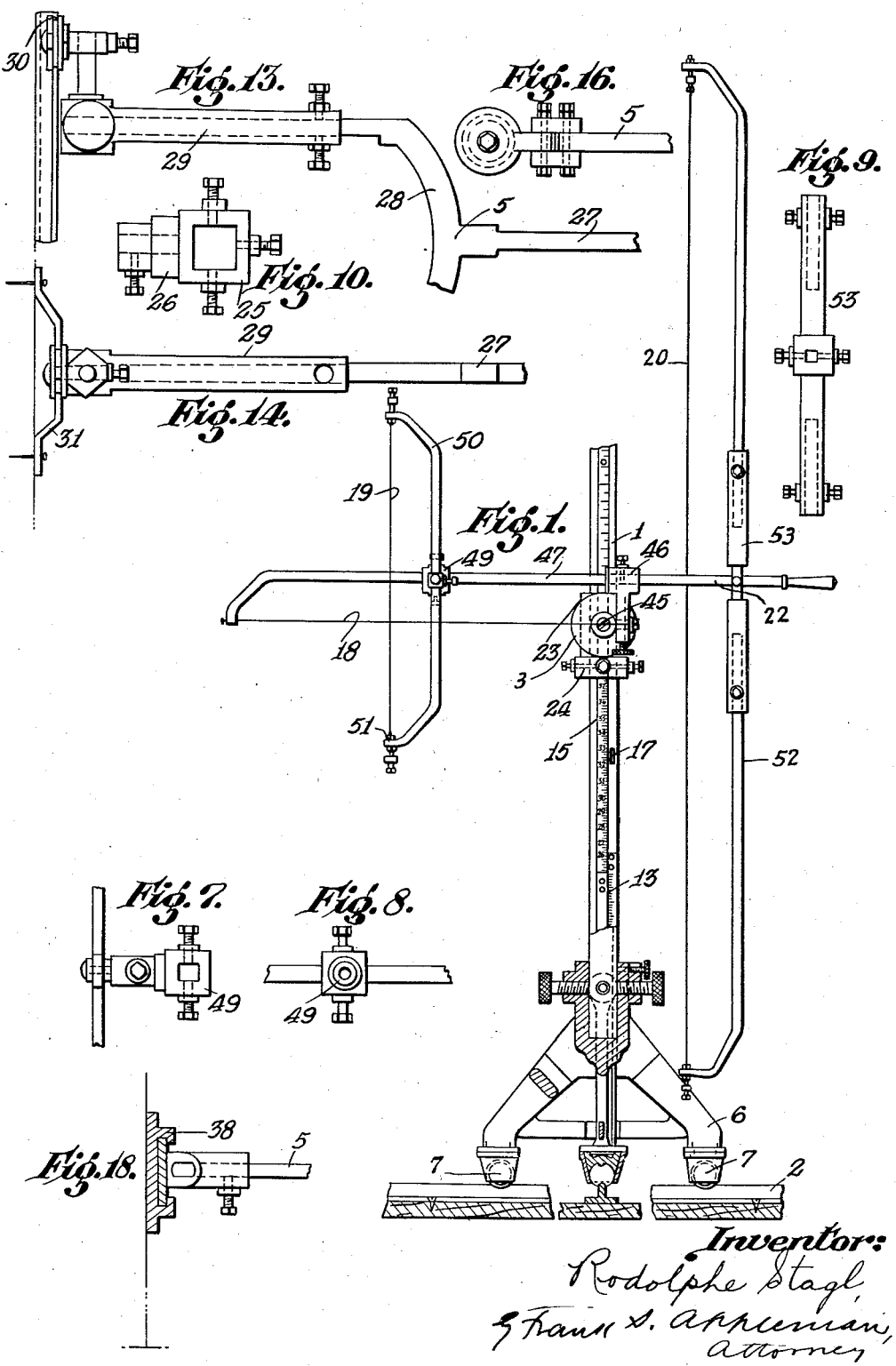

Feb. 28, 1939.　　　R. STAGL　　　2,149,191

SCULPTURAL, ARCHITECTURAL, AND LIKE OBJECTS

Filed Oct. 2, 1935　　　3 Sheets-Sheet 3

Patented Feb. 28, 1939

2,149,191

UNITED STATES PATENT OFFICE 2,149,191

SCULPTURAL, ARCHITECTURAL, AND LIKE OBJECTS

Rodolphe Stagl, Brussels, Belgium

Application October 2, 1935, Serial No. 43,282
In Germany October 2, 1934

8 Claims. (Cl. 41—25)

Hitherto sculptures, ornamentations on buildings and so on have always been made in the form so as to give a true impression of what they represent when placed at eye level. When in their final position, however, they may be considerably above or below eye level and the observer then obtains quite a different impression of them and the harmony of the composition may thus be entirely destroyed.

This is avoided in accordance with the invention by forming the surfaces of sculptures and architectural works so as to take into account the final position of the object relatively to a predetermined observation point.

Some examples of forms of construction of devices for carrying out the invention are shown in the drawings in which:

Figure 1 is an elevation partly in section of a clay cutting device in accordance with the invention for cutting reliefs on flat surfaces;

Fig. 2 is an enlarged fragmentary detail in plan with parts in section;

Fig. 3 is an enlarged elevation of a detail with parts broken away;

Fig. 4 is an enlarged plan view of a detail;

Fig. 5 is an enlarged elevation of a detail;

Fig. 6 is a plan view of Fig. 3 with a part removed;

Fig. 7 is a side elevation of a detail;

Fig. 8 is a side elevation of the detail of Fig. 7 taken at right angles thereto;

Fig. 9 is an enlarged elevation of a detail;

Fig. 10 is an enlarged plan view of a detail;

Fig. 13 is a fragmentary plan view of a guide arm used for forming reliefs on flat surfaces;

Fig. 14 is an elevation of Fig. 13;

Fig. 15 is a fragmentary plan view of a guide arm used for forming reliefs on round surfaces;

Fig. 16 is an elevation of Fig. 15;

Fig. 17 is a fragmentary plan view of a guide arm used when forming reliefs on half round surfaces; and Fig. 18 is an elevation of Fig. 17.

The clay cutter shown in Figure 1 has a vertical guide column 1 arranged to run on a rail 2. At eye level there is arranged on the column a cutter 4 which can be adjusted and a graduated dial 3 (Figures 3, 5 and 6) the graduations of which serve to indicate the angular position of the cutter.

When the apparatus is to be used for forming reliefs on plane surfaces, the column 1 is arranged on a straight rail 2 (Figure 2) which runs parallel to the plane of the surface on which the relief is to be formed.

Figure 11:
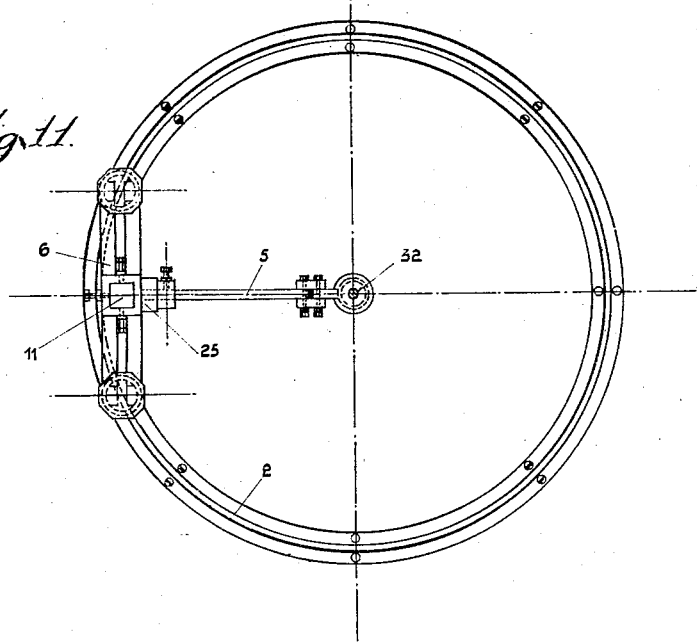
Fig. 11 is a plan view of the device arranged for forming reliefs on round surfaces.

For reliefs on cylindrical surfaces a circular rail 2 is used (Figure 11).

Figure 12:
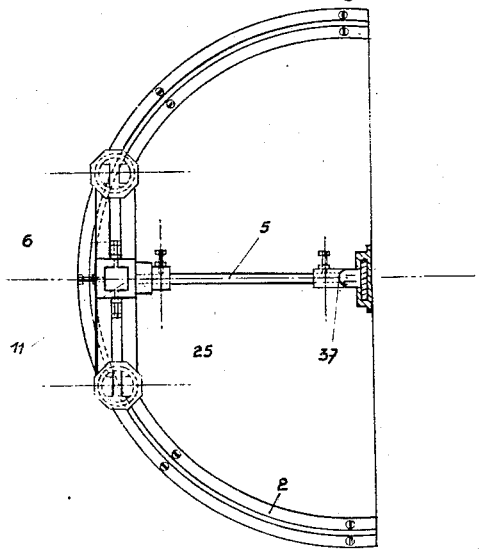
Fig. 12 is a plan view of the device arranged for forming reliefs on half round surfaces.

For reliefs on semi-cylindrical surfaces, the rail 2 need, of course, only be semi-circular (Figure 12).

The guiding column 1 is carried by a two-legged support 6 provided with balls 7 which run on the rail 2. A short scale 13 graduated in centimetres and millimetres is arranged on the column 1 and can be lowered until it rests on the upper surface of the rail 2. It is preferably 50 centimetres long. Another similarly divided scale 15 is fixed on the column 1 and preferably has a length of 1.5 metres. This scale 15 forms a continuation of the scale 13 when the latter is lowered to its full extent. By means of these two scales the height of the cutter from the upper surface of the rail 2 can be measured. A further scale 16 is arranged on another side of the column 1. This scale is also preferably 1.5 metres long and extends downwards from the upper end of the column 1. It overlaps the scale 15 so that the eye level can be set on both scales. A bubble level 17 is also arranged on the square post.

The cutter 4 and its wire 18 and the dial 3 are mounted on a slide 23 (Figure 3) which is vertically displaceable on the column 1. The cutter can thus be set at various heights and the angular position of the wire read off on the dial. At its upper end, the column 1 is provided with a guide arm 5, the nature of which varies with the nature of the surface on which reliefs are to be cut. Three different forms of guide arms are shown in Figures 13 and 14, Figures 15 and 16 and Figures 17 and 18. These guide arms 5 have square shafts which can be fixed in the bush 26 of a guide 25 (Figure 10). The guides 25 can be held in any position on the column 1 by clamping screws. The arm 5 shown in Figures 13 and 14 which is for reliefs on flat surfaces has a shaft 27 with a fork 28. Carriers 29 are mounted on the limbs of the fork and carry grooved rollers 30 at their free ends. These grooved rollers 30 run between two horizontal guides 31 fixed to the wall or the like on which the relief is to be formed. The straight rails 2 are set exactly parallel to the guides 31 and the clay cutter is then set for operation. For the purpose of cutting or shaping the relief the cutter is set in the required position and the whole arrangement is moved on the straight horizontal rails 2 and in the guides 31.

The guide arm 5 used for round objects (Figures 15 and 16) has a pin 35 at its free end which can be set in the central axis of the clay object. For the purpose of cutting the surfaces, the column 1 is moved on the circular rail 2 (Figure 11) which is centred about the axis of the pin 35.

The guide arm 5 used for reliefs on half-round surfaces (Figures 17 and 18) can pivot about a vertical axis through the hinge 37 and is removably connected to the plate 38 which can be fixed to the wall or the like at the desired height. For the purpose of cutting the surfaces, the column 1 is moved over the semi-circular rail 2 (Figure 12).

A reference line 42 (Figure 3) is formed on the slide 23 by means of a notch 41 and is set exactly at eye level. The height of the eye level above the rail 2 is indicated on the scale on the column 1. The axis of the dial 3 is in the same horizontal plane as the reference line 42. The pointer 22 is passing through the hub 43 of the dial to which it can be fixed by the screw 54. The wire 18 of the cutting member is tensioned by adjustment of its bow 47 in the part 46 which is fixed on the spindle 44. The wire 18 passes through the axis of the spindle 44 to a member 45 on the part 46 whereby the wire can be adjusted. The bow 47 of the cutter extends beyond the column 1 and terminates in a handle 48. By means of the handle 48 the bow 47 can be caused to turn about the axis of the spindle 44 and to carry the spindle 44 and the pointer 22 with it. In this way, the cutting wire is displaced through an angle to the horizontal which is the angle of slope of the surface to be cut and which can be read off the dial 3. When the cutter 47, 18 has been thus set it is fixed by means of the screw 54. A spring (not shown) is provided in the hub 43 for holding the cutter 47, 18 by friction in the various positions.

A second cutter 50, 19 is removably and pivotally fixed on the bow 47 by means of a connection 49 (Figures 7 and 8). The wire 19 can be tensioned by means of a screw 51.

The cutter 50, 19 can be replaced by a larger cutter 52, 20 on the connection 49. The holding member 49 has, however, to be displaced completely forwards on the bow 47. The parts of the bow 52 are normally mounted in the holder 53 (Figure 9).

The two cutters 50, 19 and 52, 20 are not used for the cutting of the finally desired surfaces. The cutter 47, 18 only is used for that purpose. They are used for roughing out the clay and are only fixed at the end of the rod 47 when it is necessary to use them.

The wire for the cutters need not necessarily be metallic wire. Wires or threads of vegetable substances such as flax, cotton, paper, artificial silk, natural silk, Panama straw, fibres can be used. Mineral substances such as iron, steel, copper, silver and so on are also useful. Animal substances such as animal hair, catgut, whalebone and so on can also be used. The thinner and stronger is the thread the better and more exact is the cutting.

The dial 3 is divided into four quarters I, II, III, IV. Each quarter is subdivided into eight equal parts and each of these parts again into ten equal parts.

I claim:

1. A device for cutting reliefs in clay comprising a vertical support movable as a whole, a wire cutter mounted to pivot about a horizontal axis adjustable on said support, a graduated dial on said support having a horizontal axis coincident with the pivotal axis of said cutter and means for guiding said support to allow it to be moved over a pre-determined path.

2. A device as claimed in claim 1, comprising also an arm mounted on said support for maintaining said support at the required distance from the surface to be cut.

3. A device as claimed in claim 1 in which said means for guiding said support is in the form of a rail forming a track for said support and comprising also a plurality of scales on said support, one of said scales being capable of displacement vertically along said support and of being lowered on to said rail, a slider carrying said graduated dial on said support, a reference mark on said slider, means for fixing said slider on said support at a height determined by said reference mark and the graduations on said displaceable scale and a pointer adapted to move about a horizontal axis with said cutter.

4. A device as claimed in claim 1 comprising also means for fixing said cutter at varying distances from said support.

5. A device for cutting reliefs in clay on plane surfaces as claimed in claim 1, in which said means for guiding said support is in the form of a stationary rectilinear rail forming a track for said support and comprising also rollers on said support adapted to rest on said rail.

6. A device for cutting reliefs in clay on cylindrical surfaces as claimed in claim 1, in which said means for guiding said support is in the form of a stationary circular rail forming a track for said support and comprising also rollers on said support adapted to rest on said rail.

7. A device for cutting reliefs in clay on semi-cylindrical surfaces as claimed in claim 1, in which said means for guiding said support is in the form of a stationary semi-circular rail forming a track for said support and comprising also rollers on said support adapted to rest on said rail.

8. A device for cutting reliefs in clay on cylindrical surfaces as claimed in claim 1, in which said means for guiding said support is in the form of a stationary circular rail forming a track for said support and comprising also rollers on said support adapted to rest on said rail, an arm extending from the upper part of said support and a vertically mounted pin on said arm adapted to be set in the vertical axis of the surface to be cut.

RODOLPHE STAGL.